(12) United States Patent
Lelong et al.

(10) Patent No.: US 7,124,215 B2
(45) Date of Patent: Oct. 17, 2006

(54) INTERNAL USB CIRCUIT CONNECTION

(75) Inventors: Stephane Lelong, Vaulnaveys le Haut (FR); Vincent Tournadre, Meylan (FR); Didier Lachieze, St. Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 10/464,447

(22) Filed: Jun. 19, 2003

(65) Prior Publication Data

US 2004/0033734 A1 Feb. 19, 2004

(30) Foreign Application Priority Data

Jun. 19, 2002 (EP) .................................. 02354100

(51) Int. Cl.
*G06F 13/12* (2006.01)
*G06F 3/00* (2006.01)

(52) U.S. Cl. .................. 710/62; 710/2; 710/5; 710/15; 710/63

(58) Field of Classification Search .................... 710/8, 710/10, 12, 13, 62, 63, 2, 5, 15
See application file for complete search history.

(56) References Cited

U.S. PATENT DOCUMENTS

| | | | | |
|---|---|---|---|---|
| 6,017,231 | A * | 1/2000 | Yoshitsugu et al. | 439/159 |
| 6,206,480 | B1 * | 3/2001 | Thompson | 361/625 |
| 6,253,329 | B1 * | 6/2001 | Kang | 713/300 |
| 6,379,167 | B1 * | 4/2002 | Zhang et al. | 439/157 |
| 6,619,971 | B1 * | 9/2003 | Chen | 439/159 |
| 6,662,259 | B1 * | 12/2003 | Lin et al. | 710/313 |
| 6,688,521 | B1 * | 2/2004 | Cheng | 235/451 |
| 6,705,878 | B1 * | 3/2004 | Liang | 439/76.1 |
| 6,776,345 | B1 * | 8/2004 | Liang | 235/486 |
| 6,814,597 | B1 * | 11/2004 | Kao | 439/159 |
| 6,867,979 | B1 * | 3/2005 | Ting | 361/727 |
| 6,928,562 | B1 * | 8/2005 | Cohen et al. | 713/320 |
| 6,934,788 | B1 * | 8/2005 | Laity et al. | 710/303 |
| 2003/0041205 | A1 * | 2/2003 | Wu et al. | 710/302 |
| 2003/0178486 | A1 * | 9/2003 | Teng et al. | 235/441 |

OTHER PUBLICATIONS

PC Update Online to Melbourne PC User Group, www.melbpc.org.au/pcupdate/2104/2014article7.htm, Apr. 2001.*
USB Type A internal to Frontx.com, www.frontx.com/cpx101_2.html.*
USB Internal Male Header to USB A Cable and USB/KK Header connector 2x5 to performance-pcs.com, www.performance-pcs.com.*

* cited by examiner

*Primary Examiner*—Kim Huynh
*Assistant Examiner*—Alan S. Chen
(74) *Attorney, Agent, or Firm*—Foley & Lardner LLP

(57) ABSTRACT

The invention describes a USB expansion device which comprises a circuit adapted to provide a USB header output and at least one USB output and a connector adapted to connect the device to a USB header located on a motherboard. The device may be modified to include a connector which is adapted to connect with a motherboard USB header socket; two or more USB connectors; and a circuit adapted to manage the USB output and a USB header output. The invention is designed for use with internal USB devices and allows them to be connected to the USB without requiring that known conventional external USB ports on a computers be connected directly to the internal component. Alternative embodiments include hub variations which allow internal USB expansion without the use of PCI cards or rerouting of USB connector cables from the exterior of the computer.

15 Claims, 2 Drawing Sheets

INTERNAL USB CIRCUIT CONNECTION

TECHNICAL FIELD

The present invention relates to methods and apparatus for providing improved USB expansion capability in computers. More particularly although not exclusively, the present invention provides for apparatus which allows the installation of USB devices in the interior of the computer chassis and/or expanded USB connectivity for external and internal USB peripherals.

BACKGROUND ART

The Universal Serial Bus (USB) provides a cable bus that supports data exchange between a host computer and a large number and type of simultaneously accessible peripherals. For details, the reader is referred to the Universal Serial Bus Specification Revision 2 dated Apr. 27, 2000, available at www.usb.org.

Since the introduction and widespread adoption of the USB standard, a flood of USB peripherals has become available on the market. This matches the now-standard inclusion of one or more USB ports on most computers. USB peripherals have the desirable characteristic that they are hot-pluggable and generally require no installation and/or configuration of peripheral-specific drivers on the host computer.

In use, a USB peripheral is simply plugged into a host computer. Assuming that the Operating System (OS) has USB support, the peripheral is recognized and the USB bus is configured appropriately.

Almost all the standard peripherals have been made available as USB devices including storage devices such as standalone disk drives and ZIP or tape units.

The development of the USB has thus greatly simplified the addition of large numbers of peripherals in a highly flexible manner. It has also facilitated the expansion of systems, the size of which would have normally been constrained by the number of free PCI or ISA slots on an internal bus or devices configurable on a SCSI or IDE bus.

With the addition of a USB hub device, a standard external USB connection can be used to connect a larger number of USB devices. From the users perspective, this expansion capability is a vast improvement over the previous need to incrementally add peripherals as this process usually requires individual configuration, installation of drivers and often resolution of problems with IRQ conflicts and the like.

However, notwithstanding the use of SCSI buses and IDE expansion cards, internal device expansion capability remains problematic. The casual user is often faced with the need to reconfigure SCSI or IDE buses when adding extra disk storage. This process can involve relatively complex procedures sometimes beyond the capability of an infrequent user. Further, in some cases, expansion of internal components may be limited by inherent limitations in the hardware or system BIOS.

It would therefore be a significant advantage if internal USB components such as disk drives, CD/DVD/CDWR drives and the like could be easily installed and used with no or little reconfiguration of the system.

One solution is shown in FIG. 3 where an external backplate USB socket 17 is connected to an internal USB device 20 via a cable 30. This is generally a less suitable technique as it involves passing cabling through the chassis wall with attendant EMI and ESD problems. It is also unsatisfactory as an external cable may be prone to accidental disconnection.

Another interim development that is also suitable for legacy systems with no on-board USB controller is to use a USB PCI expansion card which is plugged into the PCI bus. An example of this is shown in FIG. 4 in a system having a USB hub on the motherboard. Such boards have the standard add-in card form-factor and, when mounted in a PCI socket, provide one or more USB sockets on the backplate of the PC chassis. Some USB expanders also provide an internal USB connection as shown in FIG. 4.

This solution may be satisfactory in some circumstances, particularly where USB devices are to be used with legacy equipment with no motherboard USB controller. However, as well as involving added cost, this technique consumes a PCI slot and in configurations where PCI slots are needed for other PCI interface cards for other peripherals this can be a problem. Also, using a PCI USB expander requires that the systems BIOS be capable of automatically configuring or at least recognizing the PCI device and/or that the PCI bus is hot-pluggable. Further, where an internal device is connected an external USB card port, the presence of a loose cable running from the exterior of the chassis to the interior may be undesirable as it requires an aperture in the chassis case which is not incorporated in a standard chassis and creates EMI and ESD weaknesses in the system. Also, this solution is generally not feasible for volume production.

The aim of the present invention is to provide an inexpensive and easily installed means for connecting internal USB devices to the USB without requiring PCI or ISA bus expansion boards and is compatible with standard motherboard configurations.

DISCLOSURE OF THE INVENTION

In one aspect the invention provides for a USB expansion device including: a USB header output; at least one USB output; an input connector adapted to connect the expansion device to a USB header located on a motherboard; and a means adapted to provide interconnection between the input connector and outputs.

In an alternative embodiment, the invention provides for a USB expansion device including a connector adapted to connect with a motherboard USB header; two or more USB connectors and a circuit adapted to manage one or more USB outputs and a USB header output.

The circuit in the USB expansion device may correspond to a USB hub circuit.

The USB expansion device may include an external power supply for powering the hub.

In an alternative embodiment the hub may be powered from the USB.

The USB expansion device preferably has a card form-factor shaped and dimensioned to plug into a USB header.

In an alternative embodiment, the USB expansion device preferably has a cable form-factor and is adapted to plug into a USB header.

In the cable form factor, the hub may be incorporated into the USB header plug or the output(s).

Alternatively, the USB expansion device may have a combination of card and cable form-factor.

In a further aspect, the invention provides for a means adapted to engage with and conceal an external USB port on a computer chassis, wherein the means is further adapted to provide information relating to whether it is engaging a functioning USB port.

Preferably, the means is further adapted to be interrogated by the computer in which it is mounted to determine whether or not it is obscuring a functioning USB port.

BRIEF DESCRIPTION OF THE DRAWINGS

The present invention will now be described by way of example only and with reference to the drawings in which.

BEST MODE FOR CARRYING OUT THE INVENTION

A typical computer provides one or more external USB connectors at the rear or at the front of the chassis. The rear connectors are directly connected to the USB output on the motherboard itself while the front USB port is generally connected to the USB header on the motherboard. This situation is for a motherboard that incorporates an on-board USB controller. Where a legacy motherboard is used, a USB expander add-in card is normally used. This is discussed above.

Following accepted construction and manufacturing techniques, motherboard USB ports are conventionally located at the rear of the motherboard mounted on the PCB as surface mount I/O connections. This allows placement of the USB socket in a similar location to the serial and parallel port(s) (not shown) on the backplate of a computer. To the present time, it has been acceptable to locate the USB socket in such a location as the connection of computer peripherals has long been treated as semi-permanent or at least only requiring connection or disconnection when the computer is being installed or relocated.

However, the plug and play characteristics of USB devices means that such devices are treated as freely hot-swappable. By contrast, changing a serial or parallel port device might have previously required system reconfiguration and/or rebooting of the computer. Further, given the large number of USB devices available, it is often insufficient to only have two available USB ports as this leads to frequent device exchange.

Figure 1:
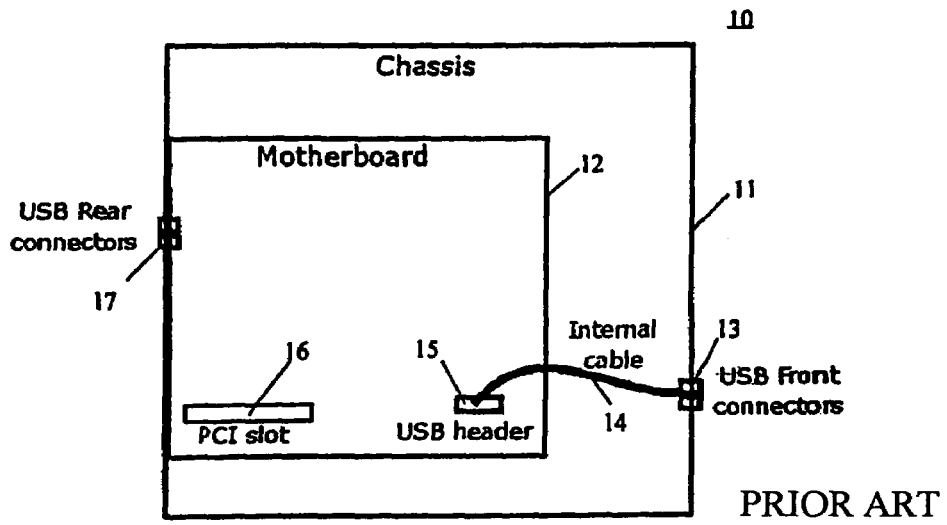
FIG. 1: illustrates a technique for connecting front and back external USB sockets to a motherboard having a USB controller.

This situation is shown in FIG. 1 where a computer 10 has a chassis 11 that contains a motherboard 12. The motherboard 12 includes a rear USB connector 17 and a PCI slot 16. Other motherboard components have been omitted for clarity.

To allow the connection of a front-panel external USB socket, the motherboard is configured to include a USB header output 15. The USB header 15 is a PCB-mounted component which is configured to take a header plug (103 in FIG. 2). The header plug and socket (103 and 15) allows an external USB 13 to be connected. This is usually mounted in the front panel of the PC. The external USB socket 13 is connected to the USB header 15 by means of a cable 14. In this case, the motherboard includes USB hub circuitry to allow multiple USB devices to be addressed. Additional USB hubs can be connected to the rear or front USB socket to allow expansion.

Figure 3:
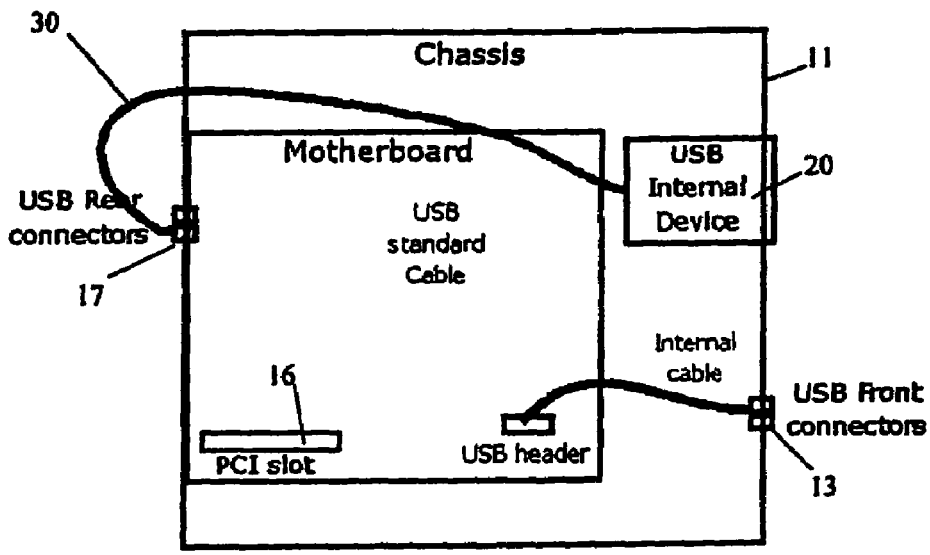
FIG. 3: illustrates a technique for connecting an internal USB device to a standard computer motherboard via an external USB socket.

At the present, if an internal USB device is to be mounted within the chassis 11, two solutions may be used. The first solution consists of an external flying lead 30 as shown in FIG. 3. While relatively easy to install, this does require that the lead pass through the chassis wall through an aperture or a purpose built port/connection. This is undesirable as any aperture in a computer chassis can lead to an increase in electromagnetic and acoustic emission. This may void EMI/ESD certification or cause the computer to fail to meet minimum requirements that a normally certified computer might have. Therefore this technique can require substantial re-engineering.

Figure 4:
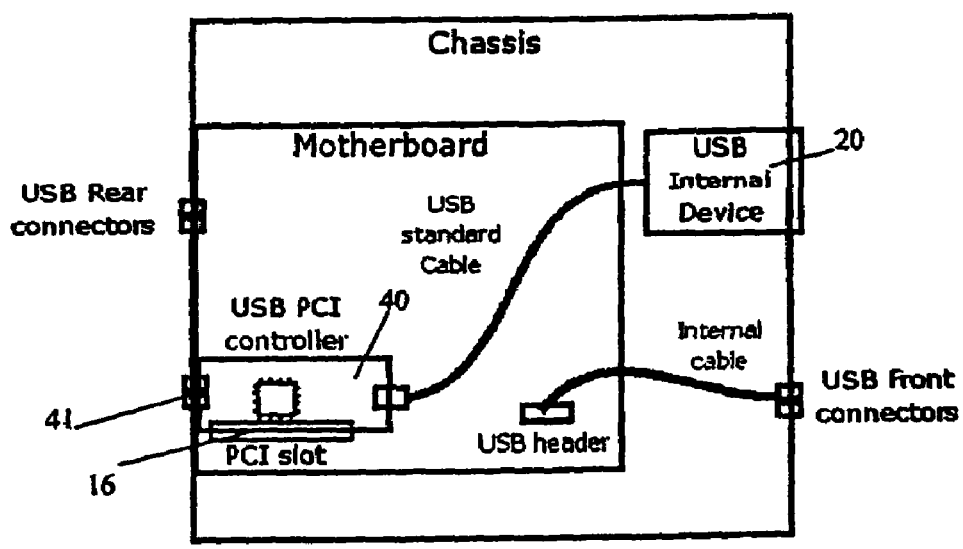
FIG. 4: illustrates a method of expanding USB connectivity using a USB PCI expander controller/hub card.

The second solution is to use a commercially available PCI USB expander card as discussed in the background section above. This is shown in FIG. 4. Here a USB PCI controller card is inserted into PCI slot 16. The USB expander card 40 can be configured as a simple extender or include USB hub circuitry to allow more than two USB devices to be simultaneously connected to the bus depending on whether the motherboard has an on-board USB controller. Referring to FIG. 4, a USB PCI controller/expander card 16 include a second USB rear socket 41 and an internal USB output which can be connected to a front external socket such as 13 in FIG. 3 or to an internally mounted USB device 20. This solution provides a relatively high degree of functionality but consumes an available PCI slot thereby limiting any further expansion of devices on the PCI bus.

This solution is also relatively expensive, as a USB PCI controller/expander requires support circuitry as well as the standard PCI bus hardware.

Figure 2:
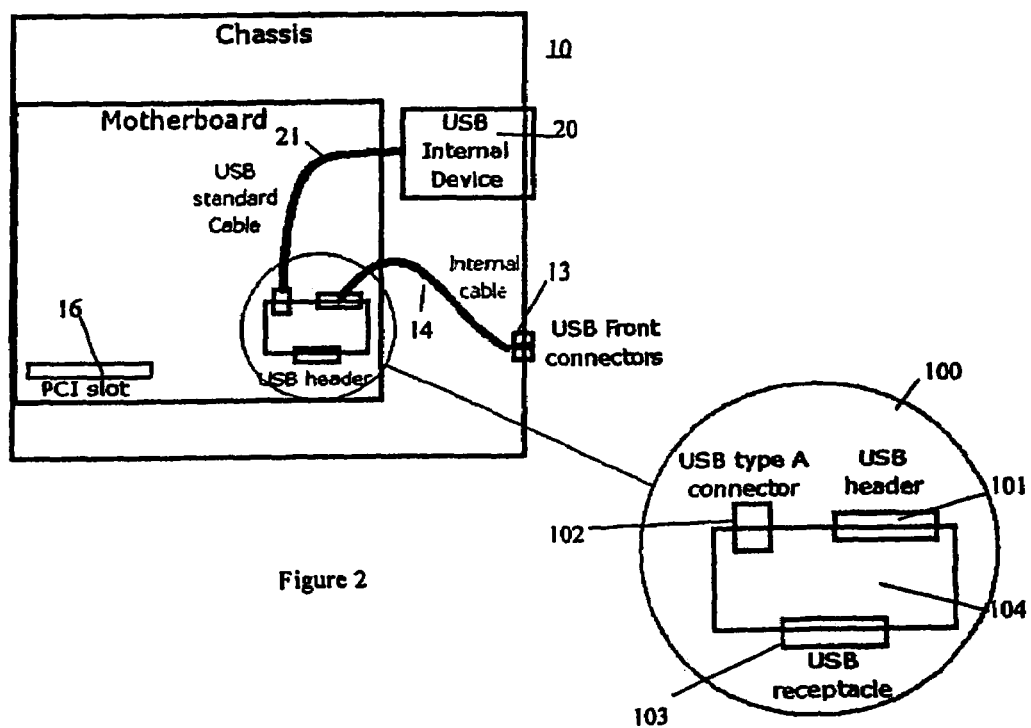
FIG. 2: illustrates a method of connecting an internal USB device to a computer motherboard using a USB expansion device.

To address these problems, the invention provides for a USB expansion device 100 as shown in FIG. 2 comprising a circuit mounted on a circuit board 104. In a first embodiment, the circuit is adapted to provide a USB header output 101 (see enlargement in FIG. 2) and at least one USB output 102. The device also includes a connector 103 adapted to connect the device to a USB header hardware located on a motherboard.

According to this embodiment, the USB expansion device retains the header/USB external connection (13, 15) and relocates the rear external USB socket in the interior of the chassis. Thus the internal USB socket 102 can be connected to the internal USB device 20 via a cable 21 without any modification to the chassis whatsoever. This embodiment requires no circuitry other than wiring to reroute the header input 103 to the internal type A USB socket 102 and the secondary header output 101. The USB expansion device 100 may be constructed in the form of a card with the requisite number of plugs and sockets. The precise geometry of this device may vary depending on the internal systems topology, particularly in terms of available space and cabling lengths. Motherboard real estate is highly dense and it is desirable to make the USB device 100 as small as possible to avoid it interfering with any inserted cards. To this end, in an alternative embodiment, the device may be made with. cable form-factor having any circuit components integrated into a flexible cable device. This may provide a preferred implementation, as a cable device can be re-routed around cards and other internal chassis components.

In an alternative embodiment (not shown in detail), the USB expansion device 100 can be configured to include a connector 103 adapted to connect with a motherboard USB header socket 15 and two or more USB connectors 102. This embodiment may also be configured to include a circuit adapted to manage the multiple USB outputs as well as a USB header output. The USB management circuit may be a USB hub circuit as known in the art and be powered externally or via the USB bus.

In use, the invention requires no operating system configuration or other system adjustment. The circuit/card 100 can be plugged into the USB motherboard header and the USB front connector 13 re-routed from the USB motherboard header 15 to the secondary USB header 101. The internal USB device 20 is then connected to the secondary USB socket 102 located on the circuit/card. If the USB hub embodiment is implemented, a further USB socket can be connected to the standard rear external USB socket fitting 17 or to additional internal USB devices. The number of internal USB devices which are supported will depend on whether the invention includes a USB hub or is the single internal USB socket adapter.

The invention can be constructed in one embodiment inexpensively as it uses standard parts and requires no on-board intelligence. If a multiple internal USB hub is required, the hub circuitry can be sourced from a number of vendors and incorporated as a complete functional unit As an additional aspect, the invention provides for a way of physically managing USB ports on a PC chassis. In the case where an external USB connection has been used for an internal connection, the external USB port may no long be functioning. In such a situation it would be an advantage to have a means which can be plugged into the port to render it unusable. This means should ideally have a USB plug form-factor and conceal the port when in place. In a further embodiment, the means may incorporate a means to detect whether or not it is obscuring an operating USB port. This may be implemented by adapting the means to include connectors which engage with the USB connections in the socket. The means is adapted so that if the USB interrogates the means, the operating system can detect that the means is plugged into the correct USB port. The means may include a conduction path which shorts out or otherwise provides an electronically detectable presence when attached to the USB bus. Other circuit embodiment may be possible depending on the specific operating system modification that is envisaged and at what level the disabled USB port detection is to occur.

The means may be molded from a plastics material and can be adapted to carry out the above functionality. It is envisaged that this device may be shipped with the USB expansion device as hereinbefore defined and used in conjunction therewith.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A USB expansion device comprising:
   a USB header output;
   at least one USB output;
   an input connector adapted to connect the USB expansion device to a USB header located on a motherboard; and
   an engaging means adapted to provide interconnection between the USB header output and other devices connected to a computer by which the expansion device is connected to via the motherboard,
   wherein the USB expansion device enables one or more internal USB devices provided entirely within a computer having a computer chassis in which the USB expansion device and the motherboard are also provided therewithin, to be connected to the motherboard by way of the interconnection means that is disposed entirely within the computer chassis.

2. A USB expansion device as claimed in claim 1, wherein the engaging means obscures the functioning USB port by coupling with one or more connection pins of the functioning USB port.

3. A USB expansion device comprising:
   a connector adapted to connect with a motherboard USB header;
   two or more USB connectors;
   a circuit adapted to manage one or more USB outputs; and
   a USB header output,
   wherein the USB expansion device enables one or more internal USB devices provided entirely within a computer chassis in which the USB expansion device and the motherboard are also provided therewithin, to be connected to the motherboard by way of one or more internal cables that are disposed entirely within the computer chassis.

4. A USB expansion device as claimed in claim 3, wherein the circuit corresponds to a USB controller and/or hub circuit.

5. A USB expansion device as claimed in claim 4, wherein the circuit corresponds to the hub circuit and wherein the hub circuit is powered from the USB.

6. A USB expansion device as claimed in claim 3, wherein the expansion device includes a hub circuit and an external power supply for powering the hub circuit.

7. A USB expansion device as claimed in claim 3, wherein the expansion device has a card form-factor shaped and is adapted to plug into a USB header.

8. A USB expansion device external to a motherboard and internal to a chassis of the motherboard, comprising:
   a connector adapted to connect with a USB header on the motherboard;
   two or more USB connectors, wherein at least one USB connector connecting to an internal USB device;
   a circuit adapted to manage the one or more USB outputs; and
   a USB header output,
   wherein the USB expansion device has a cable form-factor and is adapted to plug into a USB header.

9. A USB expansion device as claimed in claim 8, wherein a hub is incorporated into the USB header plug.

10. A USB expansion device as claimed in claim 8, wherein the cable form-factor corresponds to a flexible cable on which the connector, the two or more USB connectors, the circuit adapted to manage the one or more USB outputs, and the USB header output are all provided thereon.

11. A USB expansion device external to a motherboard and internal to a chassis of the motherboard, comprising:
   a connector adapted to connect with a USB header on the motherboard;
   two or more USB connectors, wherein at least one USB connector connecting to an internal USB device;
   a circuit adapted to manage the one or more USB outputs; and
   a USB header output,
   wherein the USB expansion device has a combination of a card and a cable form-factor.

12. A USB device comprising:

means for engaging with and concealing an external USB port on a computer chassis, wherein the engaging means is configured to enable an internal USB device to be coupled with the external USB port and function normally as if the internal USB device was an only device connected to the external USB port; and means for providing information relating to whether the engaging means is engaging a functioning USB port provided on the computer chassis.

13. A USB device as claimed in claim 12, further comprising:

interrogation response means for, in response to an interrogation output by the computer in which the USB device is mounted, to determine whether or not the engaging means is obscuring a functioning USB port.

14. A USB device as claimed in claim 13, wherein the interrogation response means includes a conduction path that shorts out which provides an electrically detectable signal to the computer when the USB device is connected to the external USB port.

15. A USB device as claimed in claim 12, wherein the internal USB device is connectable to an interior portion of the external USB port that faces inwards with respect to the computer chassis, and wherein the engaging means is connectable to an exterior portion of the external USB port that faces outputs with respect to the computer chassis.

* * * * *